US011915563B2

(12) United States Patent
Poindron et al.

(10) Patent No.: US 11,915,563 B2
(45) Date of Patent: Feb. 27, 2024

(54) VENDING APPARATUS FOR AEROSOL GENERATING ARTICLES

(71) Applicant: PHILIP MORRIS PRODUCTS S.A., Neuchâtel (CH)

(72) Inventors: Cyrille Poindron, Cruseilles (FR); Louis-Philippe Vancraeynest, Marke (BE); Guido Janeke, Lonay (CH); Loic Samson, Morges (CH)

(73) Assignee: Philip Morris Products S.A., Neuchâtel (CH)

(*) Notice: Subject to any disclaimer, the term of this patent is extended or adjusted under 35 U.S.C. 154(b) by 0 days.

(21) Appl. No.: 17/629,596

(22) PCT Filed: Jul. 16, 2020

(86) PCT No.: PCT/IB2020/056671
§ 371 (c)(1),
(2) Date: Jan. 24, 2022

(87) PCT Pub. No.: WO2021/014281
PCT Pub. Date: Jan. 28, 2021

(65) Prior Publication Data
US 2022/0254215 A1 Aug. 11, 2022

(30) Foreign Application Priority Data
Jul. 25, 2019 (EP) .................................... 19188440

(51) Int. Cl.
*G07F 9/00* (2006.01)
*G06Q 20/18* (2012.01)
(Continued)

(52) U.S. Cl.
CPC ............. *G07F 9/009* (2020.05); *G06Q 20/18* (2013.01); *G07F 9/002* (2020.05); *G07F 9/006* (2013.01);
(Continued)

(58) Field of Classification Search
CPC ..................................................... G06Q 20/18
See application file for complete search history.

(56) References Cited

U.S. PATENT DOCUMENTS

2003/0019879 A1  1/2003  Hubicki
2004/0103033 A1* 5/2004  Reade ................. G07G 1/0045
                                                                705/16
(Continued)

FOREIGN PATENT DOCUMENTS

CN    101855656 A    10/2010
CN    102057408      5/2011
(Continued)

OTHER PUBLICATIONS

European Search Report for EP 19188440.2 issued by the European Patent Office; dated Dec. 6, 2019; 8 pgs.
(Continued)

*Primary Examiner* — Timothy R Waggoner
(74) *Attorney, Agent, or Firm* — Mueting Raasch Group

(57) ABSTRACT

A vending apparatus includes an interface configured to allow a user to select a consumable for use in an aerosol generating device. A first compartment stores the selected consumable. A dispenser apparatus is configured to dispense the selected consumable from the first compartment to the user. A controller is operably coupled to the user interface and the dispenser apparatus and is configured to cause the dispenser to retrieve the selected consumable from the first compartment and to dispense the selected consumable to the user. A communication apparatus is operably coupled to the controller and is configured to receive data regarding the aerosol generating device.

14 Claims, 3 Drawing Sheets

(51) Int. Cl.
*G07F 9/02* (2006.01)
*G07F 17/00* (2006.01)
*A24F 40/10* (2020.01)
*A24F 40/42* (2020.01)

(52) U.S. Cl.
CPC .......... *G07F 9/023* (2013.01); *G07F 17/0042* (2013.01); *A24F 40/10* (2020.01); *A24F 40/42* (2020.01)

(56) References Cited

U.S. PATENT DOCUMENTS

| | | | |
|---|---|---|---|
| 2009/0070234 | A1 | 3/2009 | Peters et al. |
| 2015/0336689 | A1 | 11/2015 | Brown et al. |
| 2016/0200463 | A1 | 7/2016 | Hodges et al. |
| 2018/0107989 | A1* | 4/2018 | Fernando ............... G06Q 10/20 |
| 2018/0108204 | A1 | 4/2018 | Zhang |

FOREIGN PATENT DOCUMENTS

| | | |
|---|---|---|
| CN | 203325078 | 12/2013 |
| CN | 203720932 | 7/2014 |
| CN | 105083761 A | 11/2015 |
| CN | 107341920 | 11/2017 |
| CN | 107527276 A | 12/2017 |
| CN | 206893000 U | 1/2018 |
| CN | 107689103 | 2/2018 |
| CN | 207535771 | 6/2018 |
| CN | 109308762 A | 2/2019 |
| CN | 109903459 A | 6/2019 |
| EP | 3289548 A1 | 3/2018 |
| JP | 2007041787 | 2/2007 |
| JP | 2007325736 | 12/2007 |
| JP | 2008234402 A | 10/2008 |
| KR | 20150092500 | 8/2015 |
| TW | 200926071 A | 6/2009 |
| WO | 2000026640 | 5/2000 |
| WO | 2010076743 | 7/2010 |
| WO | 20121238208 | 10/2012 |
| WO | 2015167476 | 11/2015 |
| WO | 20160173955 | 11/2016 |

OTHER PUBLICATIONS

International Search Report and Written Opinion for PCT/IB2020/056671, issued by the European Patent Office; dated Aug. 12, 2020; 14 pgs.
International Preliminary Report on Patentability for PCT/IB2020/056671, issued by the European Patent Office; dated Sep. 27, 2021; 16 pgs.
Moore, John "'World First' cryptocurrency payments system for vending machines launched," Crypto News Review, Mar. 28, 2018; 3 pgs.
Chinese Office Action for CN Application No. 202080049135.0 issued by the China National Intellectual Property Administration; 19 pgs. Including English translation.
Chinese Rejection Decision for CN Application No. 202080049135.0, issued by the China National Intellectual Property Administration, dated Sep. 26, 2023; 13 pgs. Including English translation.

* cited by examiner

VENDING APPARATUS FOR AEROSOL GENERATING ARTICLES

This application is the § 371 U.S. National Stage of International Application No. PCT/IB2020/056671, filed 16 Jul. 2020, which claims the benefit of European Application No. 19188440.2, filed 25 Jul. 2019, the disclosures of which are incorporated herein by reference.

This disclosure relates to vending apparatus, such as vending machines, which dispense aerosol generating devices or associated components or accessories.

Vending machines for tobacco products, such as cigarettes, tend to be generic without many specialized features. However, as more people transfer from smoking cigarettes to using products, such as e-cigarettes or other non-cigarette aerosol generating devices, consumers may be concerned with whether consumable aerosol generating articles dispensed by the vending machine are compatible with their aerosol generating devices, because the dispensed aerosol generating articles may come in a variety of formats, shapes and sizes. In addition to having a variety of formats, shapes, and sizes, consumable aerosol generating articles may contain a variety of different aerosol forming substrates, which may provide, for example, a variety of different flavors. With the number of potential options, users may desire a vending machine that presents relevant options for aerosol-generating articles available for purchase and dispensing.

Users of aerosol generating devices are not only concerned with whether the aerosol generating article to be dispensed by the vending machine are appropriate, the users may also be concerned with whether their aerosol generating device is working properly. Unlike traditional cigarettes, many aerosol generating devices are re-usable. These devices may need maintenance, may break, may run out of battery, etc. The user may not be fully aware of how to handle maintenance or may not know what exactly is wrong with their aerosol generating device. Users may desire a vending machine that provides information regarding the status of their aerosol generating device and whether their device is in need of repair or updating.

The vending apparatus for aerosol generating articles described herein may receive information regarding a user's aerosol generating device. The vending apparatus may use such information to provide the user with tailored choices of aerosol generating articles for dispensing.

The vending apparatus may use such information to provide a user with the status of the user's device.

The vending apparatus described herein may dispense one or more of replacement parts for aerosol generating devices and replacement aerosol generating devices. The vending apparatus may provide recommendations for replacement parts or replacement devices based on information received regarding the user's aerosol-generating device.

By way of example, a vending apparatus may comprise an interface configured to allow a user to select a consumable for use in an aerosol generating device and may comprise a first compartment for storing the selected consumable. The vending apparatus may further comprise dispenser apparatus configured to dispense the selected consumable from the first compartment to the user and may comprise a controller operably coupled to the user interface and to the dispenser apparatus. The controller may be configured to cause the dispenser to retrieve the selected consumable from the first compartment and to dispense the selected consumable to the user. The vending apparatus may also comprise communication apparatus operably coupled to the controller. The communication apparatus may be configured to receive data regarding the aerosol generating device. The communication apparatus may communicate directly with the aerosol generating device to receive the data regarding the aerosol generating device. The communication apparatus may communicate with an intermediary device, such as a personal computing device.

The data regarding the aerosol generating device may include one or more of (i) data regarding model of the aerosol generating device, (ii) data regarding consumables previously used with the aerosol generating device, and (iii) data regarding user preferences associated with the aerosol generating device. The controller may be configured to cause the interface to present choices of consumables to the user based on one or more of the model of the aerosol generating device, the data regarding the consumables previously used with the aerosol generating device, and the data regarding user preferences associated with the aerosol generating device.

For example, the controller may (i) receive data regarding the model of the aerosol generating device, (ii) determine, based on such data, the consumables within the first compartment that may be compatible with the user's model of device, and (iii) cause the interface to present those compatible choices to the user. The controller may (i) receive data regarding the consumables previously used with the aerosol generating device, (ii) determine, based on such data, whether any of the previously used aerosol generating articles or similar articles are available to be dispensed, and (iii) cause the interface to present those same or similar choices to the user. The controller may (i) receive data regarding the user's preferences, (ii) determine, based on such data, whether any consumables in the first compartment meet criteria indicative of the user's preferences, and (iii) cause the interface to present those consumables in the first compartment that meet the criteria. Any combination of the above may also be performed.

By way of another example, the data regarding the aerosol generating device received by the communication apparatus may comprise data regarding the status of the device. The controller may be configured to determine whether the aerosol generating device may benefit from repair based on the data regarding the status of the aerosol generating device. In addition or alternatively, the vending apparatus may further comprise network apparatus operably coupled to the controller and configured to transmit data regarding the status of the aerosol generating device to a remote server and configured to receive data regarding whether the aerosol generating device may benefit from repair. The controller may be configured to cause the interface to present information to the user regarding the status of the aerosol-generating device.

The vending apparatus may also be configured to dispense replacement parts for aerosol generating devices or replacement aerosol generating devices. The controller may be configured to cause the interface to present choices of replacement parts or replacement devices to the user based on the data regarding the status of the device. For example, if a determination is made that the user's aerosol generating device may benefit from repair, the interface may present choices regarding the components that may be beneficial for the repair, and the user may select a choice to cause the component to be dispensed from the vending apparatus.

The vending apparatus described herein may provide one or more advantages over previously available vending apparatus for consumables or components for use with aerosol generating devices. As indicated above, the vending apparatus described herein may be configured to provide a user with a selection of consumables for use with aerosol generating devices to be dispensed, where the selection is tailored to one or more of the aerosol generating device and the user. Because the choices will be tailored, the user interaction with the vending apparatus may be more pleasant and efficient. Because the interaction may be more efficient, the throughput of the vending apparatus may be increased.

Depending on the configuration of the vending apparatus, the user may be assured of one or more of the following: (i) the choices of consumables presented by the interface of the vending apparatus are compatible with the user's aerosol generating device; (ii) the choices of consumables presented by the interface of the vending apparatus are consistent with the user's history; and (iii) the choices of consumables presented by the interface of the vending apparatus are consistent with the user's preferences.

The vending apparatus described herein may be configured to determine the status of a user's aerosol generating device. The vending apparatus may inform the user of the status of the aerosol generating device. If the device is working properly, the user may have peace of mind in knowing that they may enjoy the dispensed consumable without fear of device malfunction. If the device is not working properly, the user may be informed that repairs may be needed and may take action to repair the device so that they may enjoy the consumable being dispensed. The vending apparatus may provide the user with choices of replacement parts or devices that may be dispensed to assist the user in taking appropriate action to repair the device. As such, the user may be placed in a position to enjoy the dispensed consumable in which they would not have been otherwise been placed if they were not able to properly repair their device.

These and other advantages will be apparent to those of skill in the art upon reading the present disclosure and accompanying figures.

The vending apparatus may be configured to contain and dispense any suitable consumable for an aerosol generating device. The consumable may comprise a cartridge containing an e-liquid, an elongate rod comprising tobacco for use in a heat-not-burn aerosol generating device, capsules comprising nicotine powder, and the like. Other aerosol generating consumables, such as cigarettes, may also be dispensed by the vending apparatus.

The vending apparatus may be configured to dispense one or more replacement parts for an aerosol generating device or replacement aerosol generating devices for use with the consumables. The replacement parts may be parts that are readily replaceable by a consumer. The parts that are readily replaceable by a consumer may depend on the construction of the aerosol generating device and may vary from device to device. Any suitable replacement part may be stored and dispensed by the vending apparatus. For example, the vending apparatus may dispense batteries, heating components, memory, computing apparatus, and the like.

The vending apparatus may be configured to dispense one or more accessory devices for use with the aerosol generating device. The vending apparatus may be configured to store and dispense any suitable accessory device. Examples of accessories that may be dispensed include charging cords, charging devices, decals that may be affixed to the aerosol generating device, cases for holding the aerosol generating device, and the like.

Regardless of the article dispensed by the vending apparatus, the vending apparatus may receive data regarding a user's aerosol generating device. The vending apparatus may employ the data to provide choices to the consumer that are tailored to the aerosol generating device or the user's preference. For example, the vending apparatus may limit choices of articles to be dispensed based on their compatibility with the device. For example, only compatible articles may be displayed by the vending apparatus to expedite the selection process and increase throughput of the vending apparatus. The vending apparatus may present choices of articles tailored to the user preference, if information regarding the user's preferences is presented to the vending apparatus. User preference may be determined, for example, from one or both of information regarding prior history of use of the aerosol generating device and information obtained from the user regarding preferences. By presenting choices related to user preference, throughput of the vending apparatus may be increased. The vending apparatus may present choices to the user that are both compatible with the user's aerosol generating device and the user's preferences, which should substantially increase the potential throughput of the vending apparatus by reducing the time that it would take a user to select an article to be dispensed relative to having the user select from all possible articles that may be dispensed. In addition, the user may find the experience to be more satisfying and less cumbersome.

Any suitable data regarding the aerosol generating device may be received by the vending apparatus. Such information includes one or more of identification number of the device; product serial number; installed software or firmware version; status, such as operating status, of the device or one or more components of the device; user's preferred brand of consumables; preferred taste of consumables; preferred type of consumables; usage history of the aerosol generating device; and types and flavors of consumables previously used with the device.

Data regarding usage history of the device may include, for example, the location of prior use of the device; duration of prior sessions of use of the device; temperature of a heating element; airflow; humidity; power consumption; number of puffs during prior sessions; duration of puffs, airflow during each puff; consumables employed, amount of nicotine consumed during a prior session; biometric parameters, such as heart rate, respiration rate, blood pressure, stress level, and the like, of the user during prior sessions; time, location, and duration of charging of a battery of the device; time of prior maintenance or cleaning; location and time when prior errors occurred; when and where the device was manufactured; when and where the device was sold; and the like.

Other information that may be received by the vending apparatus includes preferred tastes and flavors the user prefers in other products such as food and drinks; the name of the user; the age of the user; the address of the user; and whether the user has any allergies or medical conditions that may be affected by use of one or consumables that may be dispensed.

The aerosol generating apparatus may comprise one or more wired or wireless communication modules for communicating with the vending apparatus or an intermediary device. The aerosol generating apparatus may include a power supply, such as a rechargeable battery, a battery charging element, memory apparatus, and a controller to control the aerosol generating elements of the device. The aerosol generating device may comprise one or more sensors. The one or more sensors may detect one or more of types of consumables used with the device and status of the device. Types of consumables may include they make and model of consumables. Status of the device may include battery charge level, battery charge history, status of aerosol generating elements, and the like. The sensors may be operably coupled to the memory; e.g. via the controller, where information from the sensors may be stored. The communication module may be operably coupled to the memory; e.g. via controller, to provide stored data to the vending apparatus.

User preferences, which may be determined by one or more of the sensors or may be input to the aerosol generating device via an intermediary device, for example following user responses to a questionnaire, or the like, may be stored in memory of the aerosol generating device. Such user preference information may be transmitted to the vending apparatus.

The vending apparatus may receive information regarding the status of the aerosol generating device or one or more components of the aerosol generating device. Status data may include battery capacity, battery charge level, current or prior resistance or impedance of heating element, battery capacity needed to power heating element, operational status of one or more sensors, and the like. The status data may be data obtained by interrogating the device and running a systems check or may be information stored in memory by the device.

Vending machine may display aspects related to status data obtained from the device, may provide recommendations for repair or maintenance of the device, may provide recommendations for replacement parts that may be used with the device, may provide recommendations for replacing the device, or the like.

Regardless of the data obtained, the vending apparatus may obtain data regarding the aerosol generating device from the aerosol generating device, from an intermediary device, or both from the aerosol generating device and the intermediary device. The vending apparatus may receive the data from any suitable intermediary device, such as a personal computing device, for example a smart phone, or the like. The intermediary device may communicate with the aerosol generating device contemporaneously with communicating with the vending apparatus to obtain data regarding the aerosol generating device. In addition or alternatively, the intermediary device may have stored data regarding the device obtained from prior communication with the device or obtained from user input regarding the device and user preferences.

The aerosol generating device, the intermediary device, or both the aerosol generating device and the intermediary device may include communication apparatus for transmitting data regarding the aerosol generating device to the vending apparatus. The communication apparatus may be passive or active. Passive communication apparatus may include a bar bode, QR code (Quick Response code), or other identifying feature that may be scanned by an appropriate reader of the vending apparatus. The communication apparatus may include an RFID (Radio-Frequency Identification) tag having information regarding the aerosol generating device, and the vending apparatus may have an RFID reader to interrogate the RFID tag. The RFID tag may be active or passive.

The aerosol generating device, the intermediary device, or both the aerosol generating device and the intermediary device may include communication apparatus may communicate with the vending apparatus in any suitable manner.

The vending apparatus may include appropriate ports, receivers, such as antenna, transmitters, or transceivers to communicate with one or both of an aerosol generating device and an intermediary device, which may include a mobile phone, a smartphone, a tablet, a smartwatch, a fitness tracker, a wearable device, smart glasses, or a portable computing device. The vending apparatus may include communication apparatus configured to communicate over a number of different protocols to allow for interaction with a vast number of aerosol generating devices and intermediary devices or may include communication apparatus configured to communicate over one or a few different protocols to allow for selective interaction with a limited number of aerosol generating devices and intermediary devices. Communication apparatus preferably includes a telemetry circuit and an antenna for bidirectional communication with other devices.

Communication between the vending apparatus and one or both of the aerosol generating apparatus and the intermediary device may occur via physical connection or wireless connection. Examples of physical connection include wired connection through, for example, a USB (Universal Serial Bus) connection, a lightning connector, or any other suitable connection or connector. Wireless communication may include radio frequency based connection such as near field communication (NFC), Bluetooth, Bluetooth Low-energy, Wireless USB, Wi-Fi, White-Fi, WiFi HalLow, Wi-FAR, WRAN, WLAN, LPWAN (Sigfox, LoRa, INGenu, Waviot, NB-Iot, LTE-M, Telensa, CYANconnode, Weight-less), phone data connection (GPRS, LTE, 3G, 4G, 5G), zigbee, z wave, RuBee, and TransferJet. Wireless communication may include light based communication such as Infrared, Li-Fi, Optical (camera+QR code or barcode). Wireless communication may include sound-based communication such as sonic communication. Wireless communication may include magnetic communication such as Near-field magnetic induction communication (NFMI).

Communication between the vending machine and one or both of the aerosol generating device and the intermediary device may be initiated in any suitable manner. For example, physical connection of one or both of the aerosol generating device and intermediary device may initiate communication. The vending apparatus and one or both of the aerosol generating device and the intermediary device may detect each other through wireless communication. The vending apparatus may send a request, via the communication apparatus, to one or both of the aerosol generating device and the intermediary device through a physical data connection or wireless connection. The vending apparatus may receive a connection request, via the communication apparatus, from one or both of the aerosol generating device and the intermediary device. Connection may be automatic upon request or may require approval by one or more of the vending apparatus, the aerosol generating apparatus, and the intermediary device.

The vending apparatus may comprise a controller operably coupled to the communication apparatus. The controller may receive data from the communication apparatus regarding the aerosol generating device. The controller may be configured to one or both of (i) determine which choices of consumable or other vendable articles to present to the user based on the data regarding the aerosol generating device, and (ii) determine whether the aerosol generating device may benefit from repair based on the data regarding the aerosol generating device.

The controller may be configured to cause networking apparatus to transmit data regarding the aerosol generating device to a remote server and receive data from a remote server regarding one or both of (i) which choices of consumable or other vendable articles to present to the user based on the data regarding the aerosol generating device, and (ii) whether the aerosol generating device may benefit from repair based on the data regarding the aerosol generating device. The server to which the data is sent and the server from which the data is received may be the same or different. The vending apparatus may contain any suitable network apparatus to send and receive information from a remote server. For example, the vending apparatus may comprise a modem.

Computational aspects associated with the data regarding the aerosol generating device may be performed by the controller, a remote server, or both the controller and the remote server. Computational aspects may be shared between the controller and the remote server. One or more computational aspects may be redundant or non-redundant between the controller and the remote server.

The vending apparatus may include an interface configured to allow a user to select one or more of a consumable for use with the aerosol generating device, a replacement part for the aerosol generating device, and an accessory for the aerosol generating device. The interface may be operably coupled to the controller, which may cause the interface to present choices of one or more of consumables, replacement parts, and accessories to the user based on the data regarding the aerosol generating device. The interface may comprise a display to visually present the choices to the user or other suitable output apparatus. The interface may comprise input apparatus to allow the user to select from the presented choices. Examples of input apparatus include a touchscreen, which may also serve as a display, a microphone, a knob, a dial, a switch, a button, a joystick, a trackball, a keyboard, a touch surface, a slider, a pressure sensor, a capacitive sensor, a resistance sensor, a conductive sensor, a mouse, and the like.

The controller may be configured to cause the interface to present to the user information regarding the status of the user's aerosol generating device based on the data regarding the aerosol generating device. The controller may be configured to cause the interface to present instructions for repair of the aerosol generating device based on the data regarding the aerosol generating device. The controller may be configured to cause the interface to present choices for replacement parts based on the data regarding the aerosol generating device.

The vending apparatus may include apparatus for updating firmware of the user's aerosol generating device. For example, the apparatus may receive the data regarding the aerosol generating device via the communication apparatus. The controller may receive the data from the communication apparatus and may determine whether the firmware is up-to-date or may transmit the data via the network apparatus to a remote server to determine whether the firmware is up-to-date. If the firmware is not up to date, the controller may cause the communication apparatus to transmit updated firmware to the aerosol generating device or an intermediary device configured to communicate with the aerosol generating device. Up-to-date firmware may be stored in memory of the vending apparatus. The firmware stored in the memory may be updated from time to time, as appropriate, via communication with a remote server or by maintenance personnel through, for example, wireless or physical data connection with an appropriate device.

The vending apparatus may comprise any suitable components to carry out the functions described herein. For example, the vending apparatus may have a suitable housing in which components and vendable articles are maintained. The vending apparatus may have any one or more of the communication apparatus, the controller, and the network apparatus described above. In addition, the vending apparatus may comprise one or more of a storage compartment for consumables; a storage compartment for replacement parts for aerosol generating devices, replacement aerosol generating devices, or both; a storage compartment for used parts, used aerosol generating devices, or both; a storage compartment for debris; a storage compartment for accessories; dispensing apparatus; charging port for charging a battery of a user's aerosol generating device; wireless charging apparatus for charging a battery of a user's aerosol generating device; and the like. One or more of the storage compartments may be combined such that multiple types of articles are stored in one storage compartment.

The vending apparatus may comprise temperature and humidity control components, such as a compressor, thermostat, hygrometer, and the like, for maintaining temperature and humidity in a storage compartment containing consumables. Alternatively or in addition, the temperature and humidity control components may regulate the temperature and humidity within the entirety of the housing of the vending apparatus.

The vending apparatus may comprise a compartment in which the dispensed consumable, replacement part, replacement device, or accessory may be presented to the user. The user may remove the dispensed article from the vending apparatus by taking the article from the compartment. The compartment may comprise a door or flap, which the user may open to remove the article. The vending apparatus may comprise a light that lights up the compartment to facilitate removal of the article by the user. The light may be activated by a switch operably coupled to the door or flap. The light may be activated by the controller when the article is dispensed to the compartment.

The vending apparatus may comprise dispenser apparatus configured to dispense an article selected by a user. The dispenser apparatus may be operably coupled to the controller, which may instruct the dispenser apparatus to retrieve a particular article based on input from the user via the interface. The dispenser apparatus may retrieve the article from the appropriate storage compartment and deliver the article to the compartment for retrieval by the user. The dispenser apparatus may comprise any suitable components for dispensing the selected article. For example, the dispensing apparatus may comprise a robotic arm that may raise or lower from a shaft and rotate or pivot relative to the shaft. The robotic arm may telescope or otherwise extend and contract as appropriate to retrieve the article. The robotic arm may include pincers to grasp and release the selected article. The dispensing apparatus may comprise helical element operably coupled to a motor. Articles to be dispensed may be retained within a pitch of the helix, and actuation of the motor may cause longitudinal movement of the articles such that articles move to a location lacking support causing the articles to drop from a storage compartment to the compartment from which the user may retrieve the article. The controller may control the movement of the helical element. The vending apparatus may comprise multiple helical elements, each retaining a different article that may be dispensed.

The vending apparatus may comprise transaction apparatus. The transaction apparatus may include a reader for a bank card, a reader for a gift certificate, components for depositing and reading cash, a module for receiving wireless payment transactions via a wirelessly connected device, such as a smart phone, smartwatch, tablet computer, or laptop computer. The wireless payment may include payment via an SMS service or QR payment code. Payment may be in the form of cryptocurrency. In some instances, the vending apparatus may receive payment wirelessly from the user's aerosol generating device.

The transaction apparatus may be operably coupled to the controller. Payment information received by the transaction apparatus may be received by the controller and transmitted via network apparatus to a remote server for payment verification. Payment verification may be received from a remote server via the network apparatus.

The vending apparatus may comprise one or more optical sensors. For example, the vending apparatus may comprise one or more camera. Preferably the camera faces a direction in which the user is most likely to stand when interacting with the vending apparatus. The optical sensors may be operably coupled to the controller which may be coupled with facial recognition software stored locally in memory of the vending apparatus or accessible via a remote server.

The vending apparatus may comprise a power supply. The power supply preferably comprises an AC power supply. The power supply may comprise a battery. Preferably, the vending apparatus comprises a backup power supply system. Preferably the backup power supply system comprises one or more batteries with sufficient capacity to allow any transaction in process to be completed if main power is lost during the transaction. For example, the backup power supply may comprise one or more batteries with sufficient capacity to allow the vending apparatus to be fully functional for at least 10 minutes once the main power has been lost.

The vending apparatus may comprise circuits and wiring to connect all electronic components in the apparatus to supply power to the component and allow the components to exchange data with each other.

The vending apparatus may comprise a module to recharge the battery of a user's aerosol generating device. The recharge module may recharge the battery of the aerosol generating device through physical connection or through a wireless recharging system, such as an inductive recharging system. The recharge module may comprise a cavity in the housing of the vending apparatus in which a user may place their aerosol generating device. The recharge module may comprise one or more suitable connectors for physical connection to the aerosol generating device.

The vending apparatus may comprise a housing of any suitable shape or size. The housing has a size and shape that provides for a structure suitable for assembling all other components. The housing may comprise a top, bottom, front, left side, right side and back. The front may comprise one or more windows for viewing consumables or dispensable components or devices stored in the vending apparatus. Preferably, at least one side of the housing or portion of the housing may be opened to perform maintenance on the vending apparatus. Preferably, the openable side or portion of the housing is lockable and unlockable to provide access, such as keyed access, to authorized personnel. Preferably, the housing comprises anchor elements to allow the vending apparatus to be anchored to its surroundings, which as to a floor, a wall, a pillar, or the like. The housing may be formed from one or more suitable material, such as a metal or metallic material, a glass material, or a plastic material. Preferably at least a portion of the housing provides a smooth surface on which a graphic element may be displayed.

The vending apparatus may be configured to provide data regarding its status to a remote server via network apparatus via a wired or wireless connection. The data regarding status may include the amount of consumables, replacement parts, replacement devices, accessories, and other dispensable articles remaining in the vending apparatus. If the amount of article remaining is low, an alert may be sent by the vending apparatus or remote server to prompt personnel to restock the article. The data regarding the status of the vending apparatus may include whether a compartment for storing used parts and devices or debris is nearly full. An alert may be sent by the vending apparatus or remote server to prompt personnel to empty the compartment.

The vending apparatus may be configured and may contain components to allow a user to connect to a remote service center. Connection to the remote service center may allow the user to contact a person to provide notice of a problem associated with the transaction or interaction with the vending apparatus or to ask questions regarding how to properly operate the vending apparatus. The vending apparatus may comprise a microphone and speaker, along with phone, VIOP (Voice Over IP) apparatus, or modem to connect the remote service center. If the vending apparatus comprises a display and camera, contact with the remote service center personnel may be in the form of a video conference. Personnel from the remote service center may be able to provide instructions or recommendations regarding aerosol generating device repair based on data regarding the aerosol generating device received by the vending apparatus. Personnel from the remote service center may be able to remotely control one or more functions of the vending apparatus.

All scientific and technical terms used herein have meanings commonly used in the art unless otherwise specified. The definitions provided herein are to facilitate understanding of certain terms used frequently herein.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open-ended sense, and generally mean "including, but not limited to". It will be understood that "consisting essentially of", "consisting of", and the like are subsumed in "comprising," and the like.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure, including the claims.

A "controller" as used herein may comprise one or more processors, such as microprocessors. The one or more processors may operate with associated data storage, or memory, for access to processing programs or routines and one or more types of data that may be employed to carry out the illustrative methods described herein. For example, processing programs or routines stored in data storage may include programs or routines for performing statistics, matrix mathematics, compression algorithms (e.g., data compression algorithms), standardization algorithms, comparison algorithms, or any other processing used to implement the one or more illustrative methods and processes described herein. Further, for example, processing programs or routines stored in data storage may include processes and functions to wirelessly transfer data between the aerosol generating device or intermediary device and the vending apparatus.

The controller may implement one or more computer programs executed on one or more programmable processors that include processing capabilities (e.g., microcontrollers, programmable logic devices, etc.), data storage (e.g., volatile or non-volatile memory and/or storage elements), input devices, and output devices. Program code or logic described herein may be applied to input data to perform functionality described herein and generate desired output information. The output information may be applied as input to one or more other devices or processes as described herein or as would be applied in a known fashion.

The computer programs used to implement the processes described herein may be provided using any programmable language, e.g., a high-level procedural or object orientated programming language that is suitable for communicating with a computer system. Any such program products may, for example, be stored on any suitable device, e.g., a storage media, readable by a general or special purpose program, controller apparatus for configuring and operating the computer when the suitable device is read for performing the procedures described herein. In other words, the controller may implement a non-transitory computer readable storage medium, configured with a computer program, where the storage medium causes the computer to operate in a specific and predefined manner to perform functions described herein.

The exact configuration of the controller is not limiting and essentially any device or devices capable of providing suitable computing capabilities and control capabilities to implement the illustrative methods described herein may be used. In view of the above, it will be readily apparent that the functionality as described herein may be implemented in any manner as would be known to one skilled in the art. As such, the computer language, the controller, or any other software/hardware which is to be used to implement the processes described herein shall not be limiting on the scope of the systems, processes or programs (e.g., the functionality provided by such processes or programs) described herein. The methods and processes described in this disclosure, including those attributed to the systems, or various constituent components, may be implemented, at least in part, in hardware, software, firmware, or any combination thereof. For example, various aspects of the techniques may be implemented within one or more processors, including one or more microprocessors, DSPs (Digital Signal Processors), ASICs (Application-Specific Integrated Circuits), FPGAs (Field Programmable Gate Arrays), CPLDs (Complex Programmable Logic Devices, microcontrollers, or any other equivalent integrated or discrete logic circuitry, as well as any combinations of such components. When implemented in software, the functionality ascribed to the systems, devices, and methods described in this disclosure may be embodied as instructions on a computer-readable medium such as RAM, ROM, NVRAM (Non-Volatile Random-Access Memory), EEPROM, flash memory, magnetic data storage media, optical data storage media, or the like. The instructions may be executed by one or more processors to support one or more aspects of the functionality described in this disclosure.

Reference will now be made to the drawings, which depict one or more aspects described in this disclosure. However, it will be understood that other aspects not depicted in the drawing fall within the scope and spirit of this disclosure. Like numbers used in the figures refer to like components, steps and the like. However, it will be understood that the use of a number to refer to a component in a given figure is not intended to limit the component in another figure labeled with the same number. In addition, the use of different numbers to refer to components in different figures is not intended to indicate that the different numbered components cannot be the same or similar to other numbered components.

The schematic drawings are not necessarily to scale and are presented for purposes of illustration and not limitation.

Figure 1:
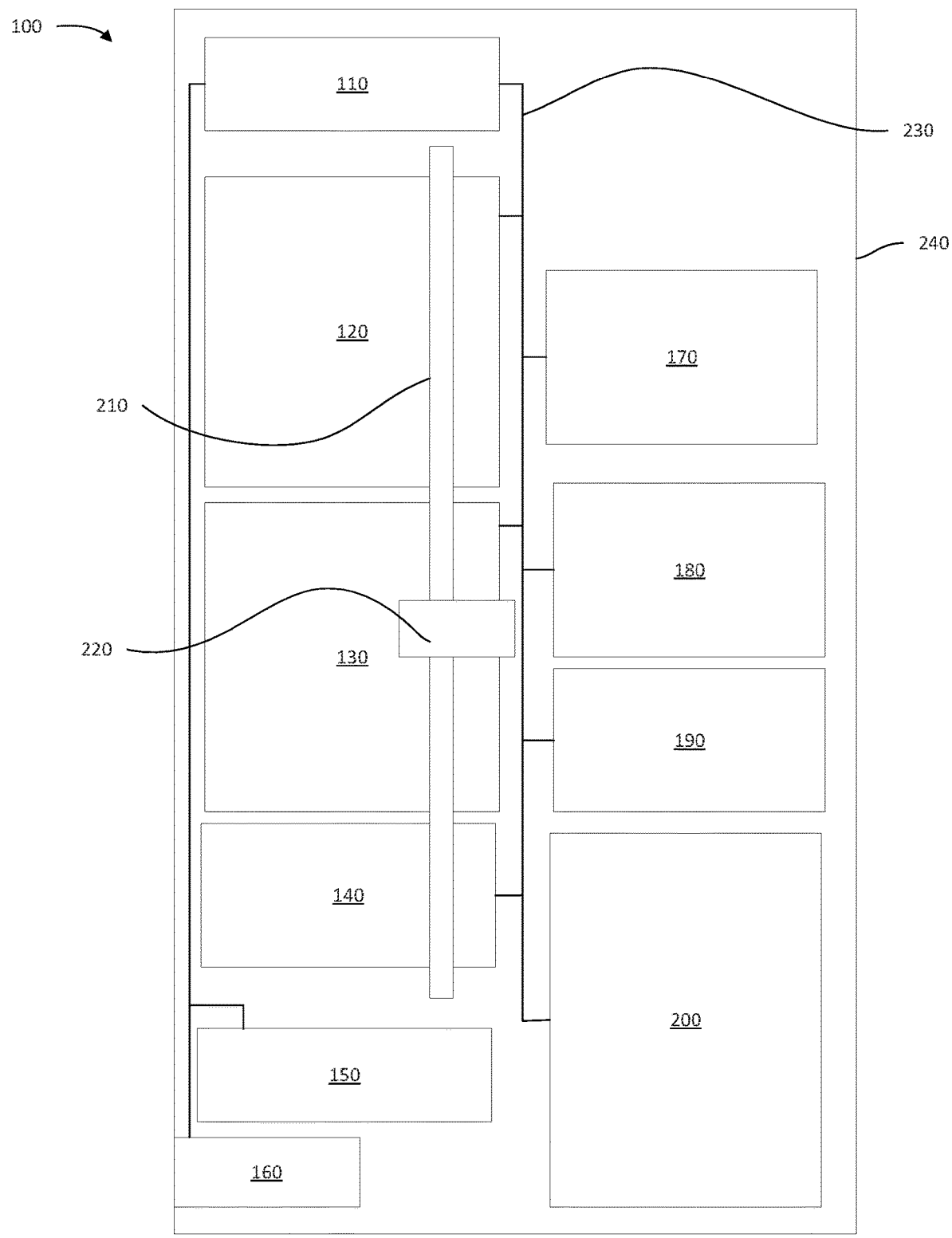
FIG. 1 is schematic front view of an illustrative vending apparatus 100 with showing internal components.

Referring now to FIG. 1, the vending apparatus 100 may comprise a housing 240 suitable for storing and assembling various components of the vending apparatus 100. The vending apparatus 100 comprises a controller 110 for controlling various functions and components of the vending apparatus 100. The controller is operably coupled to power supply 160 and backup power supply unit 150. Wring 230 electrically couples components of the vending apparatus 100. The controller is operably coupled to dispenser apparatus, which includes a shaft 210 and a robotic arm 220 that may raise or lower and pivot or rotate relative to the shaft 210. The vending apparatus 100 includes a storage compartment for consumables 120, a storage compartment for accessories 130, and a storage compartment for replacement parts or devices 140. The controller 110 may cause the robotic arm 220 to retrieve a consumable, accessory, or replacement part from the appropriate compartment 120, 130, 140 and deliver the consumable, accessory, or replacement part to a compartment 190 from which the user may retrieve the consumable, accessory, or replacement part. The vending apparatus may contain a recharge module 180 and a storage compartment 200 for storing used parts. A door or opening (not shown) for inserting used parts and device into the storage compartment 200 from external to the housing 240 may be positioned on a side of the vending apparatus 100.

The vending apparatus 100 includes one or both of communication and network apparatus 170 operably coupled to the controller 110. Information regarding a user's aerosol generating apparatus may be received by the communication apparatus 170 and provided to controller 110, which may provide the data to a remote server via network apparatus 170 or may use the data to determine appropriate action based on the data. For example, the controller 110 may be configured to cause an interface (see interface 260 in FIG. 2) to present choices of consumables to the user based the data regarding the aerosol generating device. The controller may be configured to determine whether the aerosol generating device may benefit from repair based on the data regarding the status of the aerosol generating device and may present choices of suitable replacement parts or present instructions regarding maintenance to the user via the interface.

Figure 2:
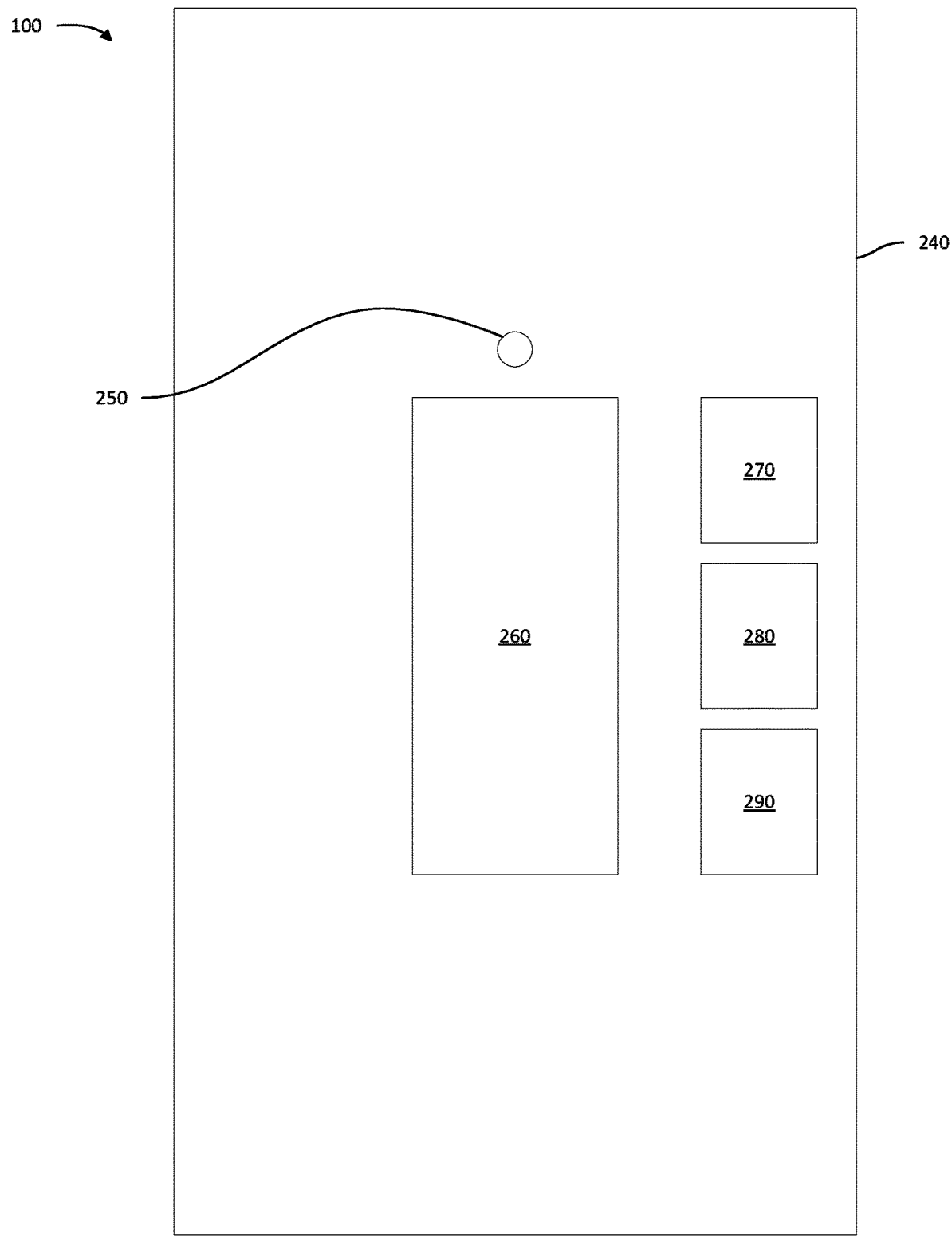
FIG. 2 is a schematic sectional view of the vending apparatus 100 of FIG. 1 showing external components.

Referring now to FIG. 2, the vending apparatus 100 may include an interface 260 such as a touch screen for interacting with a user. The vending apparatus 100 may include a payment module 270 operably coupled to the power supply (see power supply 160 in FIG. 1) and controller (see controller 110 in FIG. 1) to allow a user to provide payment for articles prior to dispensing the articles to the vending compartment (see vending compartment 190 in FIG. 1), which is accessible by opening door 290. The vending apparatus 100 also comprises a cavity 280 providing access to charging module (see recharge module 180 in FIG. 1). The vending apparatus 100 further comprises a camera 250 operably coupled to the power supply and the controller. The camera 250 may be employed during a video conference if the user contacts a remote service center.

Figure 3:
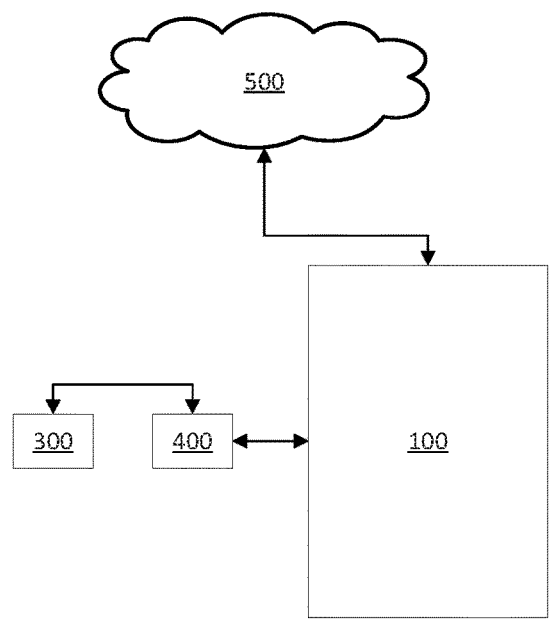
FIGS. 3-5 are a schematic block diagrams illustrating connections schemes to provide data regarding an aerosol generating device 300 to vending apparatus 100.

Referring now to FIG. 3, a connection scheme for communication between an aerosol generating device 300, an intermediary device 400, and the vending apparatus 100 is shown. The aerosol generating device 400 may communicate with the intermediary device 400, which transmits data regarding the aerosol generating device 300 to the vending apparatus 100. The communication of the aerosol generating device 300 with the intermediary device 400 may be contemporaneous with the communication of the intermediary device 400 with the vending apparatus 100 or may occur prior to communication of the intermediary device 400 with the vending apparatus 100. The vending apparatus 100 is capable of communicating with a remote server 500. Data regarding the aerosol generating device 300 or data regarding the vending apparatus 100 may be provided to the remote server 500.

Figure 4:
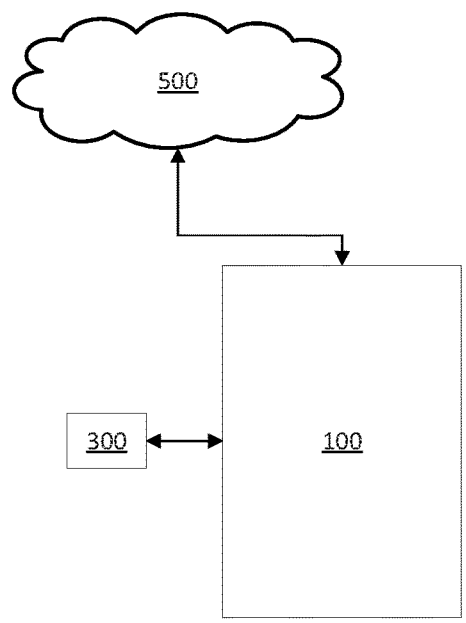
Figure 5:
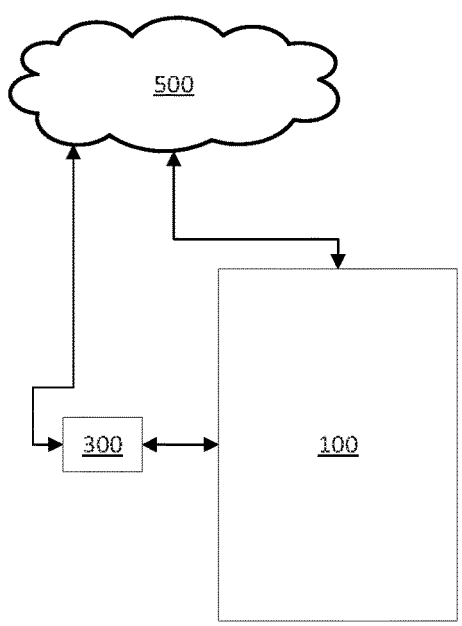

In FIG. 4, the aerosol generating device 300 communicates directly, either through physical connection or wirelessly, with the vending apparatus 100, which may communicate with the remote server 500. In FIG. 5, the aerosol generating device 300 may also communicate with the remote server 500.

These and other connection schemes may be employed to allow the vending apparatus 100 to carry out the functions described herein.

The invention claimed is:

1. A vending apparatus comprising:
an interface configured to allow a user to select a consumable for use in an aerosol generating device;
a first compartment for storing the selected consumable;
dispenser apparatus configured to dispense the selected consumable from the first compartment to the user;
a controller operably coupled to the user interface and the dispenser apparatus and configured to cause the dispenser to retrieve the selected consumable from the first compartment and to dispense the selected consumable to the user; and
communication apparatus operably coupled to the controller and configured to receive data regarding the aerosol generating device,
wherein the data regarding the aerosol generating device includes one or more of (i) data regarding model of the aerosol-generating device, (ii) data regarding consumables previously used with the aerosol generating device, and (iii) data regarding user preferences associated with the aerosol-generating device, and
wherein the controller is configured to cause the interface to present choices of consumables to the user based on one or more of the model of the aerosol generating device, the data regarding the consumables previously used with the aerosol generating device, and the data regarding user preferences associated with the aerosol generating device, wherein the choices of consumable is selected from a cartridge containing an e-liquid, an elongate rod comprising tobacco, and a capsule comprising nicotine powder.

2. The vending apparatus according to claim 1, wherein the data regarding the aerosol generating device includes data regarding a status of the aerosol generating device and wherein the controller is configured to determine whether the aerosol generating device may benefit from repair based on the data regarding the status of the aerosol generating device.

3. The vending apparatus according to claim 2, further comprising network apparatus operably coupled to the controller and configured to transmit the data regarding the status of the aerosol generating device to a first remote server and to receive information from a second remote server regarding whether the aerosol generating device may benefit from repair, wherein the first and second remote servers are the same or different.

4. The vending apparatus according to claim 2, wherein the controller is configured to cause the interface to present information to the user regarding the status of the aerosol generating device.

5. The vending apparatus according to claim 2, wherein the controller is configured to cause the interface to present information to the user regarding repairs that may be performed on the device based on the status of the aerosol generating device.

6. The vending apparatus according to claim 5,
further comprising a second compartment for storing one or more components of the aerosol generating device or a replacement aerosol generating device,
wherein the dispensing apparatus is configured to dispense the one or more components of the aerosol generating device or the replacement aerosol generating device from the second compartment to the user, and
wherein the controller is configured to present choices of the one or more components or the replacement aerosol generating device to be dispensed based on the status of the aerosol generating device.

7. The vending apparatus according to claim 6, further comprising a third compartment for receiving used components of the aerosol generating device or for receiving the aerosol generating device.

8. The vending apparatus according to claim 2, wherein repairs that may be performed on the aerosol generating device comprise updating the firmware of the aerosol-generating device, and wherein the controller is configured to cause the communication apparatus to transmit updated firmware to the aerosol generating device or an intermediary device configured to communicate with the aerosol generating device.

9. The vending apparatus according to claim 1, further comprising a fourth compartment for storing one or more accessories for use with the aerosol generating device, and wherein the dispensing apparatus is configured to dispense the one or more accessories from the fourth compartment to the user.

10. A method comprising:
providing the vending apparatus according to claim 1; and
interrogating the aerosol generating device via the communication apparatus to receive the data regarding the aerosol-generating device.

11. The method according to claim 10,
wherein the data regarding the aerosol generating device includes one or more of (i) data regarding model of the aerosol-generating device, (ii) data regarding consumables previously used with the aerosol generating device, and (iii) data regarding user preferences associated with the aerosol generating device, and
wherein the method further comprises:

transmitting the data regarding the aerosol generating device to the controller; and determining choices of consumables to present to the user, via the controller, based on one or more of the data regarding the model of the device, the data regarding the consumables previously used with the aerosol generating device, and the data regarding user preferences associated with the aerosol-generating device.

12. The method according to claim 11, further comprising:

sending instructions from the controller to the interface to cause the interface to present information to the user regarding whether the aerosol generating device may benefit from repair.

13. The method according to claim 10, further comprising:

transmitting the data regarding the aerosol generating device to the controller, wherein the data regarding the aerosol generating device includes data regarding a status of the aerosol generating device; and determining, via the controller, whether the aerosol generating device may benefit from repair based on the data regarding the status of the aerosol generating device.

14. The method according to claim 10, wherein the vending apparatus further comprises network apparatus operably coupled to the controller and configured to transmit the data regarding the aerosol generating device to a first remote server, wherein the data regarding the aerosol generating device includes data regarding a status of the aerosol-generating device, and wherein the network apparatus is configured to receive information from a second remote server regarding whether the aerosol generating device may benefit from repair, wherein the first and second remote servers are the same or different.

* * * * *